(12) United States Patent
Cimatti

(10) Patent No.: US 8,272,682 B2
(45) Date of Patent: Sep. 25, 2012

(54) CHASSIS OF A VEHICLE PROVIDED WITH AN EXTRUDED CENTRAL PILLAR

(75) Inventor: Franco Cimatti, Via Gaiato (IT)

(73) Assignee: Studio Torta S.p.A. (IT)

( * ) Notice: Subject to any disclaimer, the term of this patent is extended or adjusted under 35 U.S.C. 154(b) by 48 days.

(21) Appl. No.: 12/844,422

(22) Filed: Jul. 27, 2010

(65) Prior Publication Data

US 2011/0025100 A1 Feb. 3, 2011

(30) Foreign Application Priority Data

Jul. 28, 2009 (IT) .............................. BO2009A0492

(51) Int. Cl.
*B60J 7/00* (2006.01)
(52) U.S. Cl. ........................................................ 296/204
(58) Field of Classification Search .................. 296/204, 296/146.6, 146.9, 187.03, 187.12, 193.05, 296/193.06, 202, 203.01, 203.03, 205, 209, 296/29, 30; 280/784, 806; 29/897.2
See application file for complete search history.

(56) References Cited

U.S. PATENT DOCUMENTS

| | | | | |
|---|---|---|---|---|
| 4,252,364 A * | 2/1981 | Toyama et al. | .......... | 296/203.01 |
| 4,440,434 A * | 4/1984 | Celli | ..................... | 296/181.2 |
| 4,973,103 A * | 11/1990 | Imajyo et al. | .......... | 296/203.04 |
| 5,228,741 A * | 7/1993 | Ide | ........................... | 296/187.11 |
| 5,246,264 A * | 9/1993 | Yoshii | .................... | 296/203.03 |
| 5,372,400 A | 12/1994 | Enning et al. | | |
| 5,398,989 A * | 3/1995 | Winter et al. | ............ | 296/203.03 |
| 5,560,674 A * | 10/1996 | Tazaki et al. | ............ | 296/193.01 |
| 5,609,385 A * | 3/1997 | Daniel et al. | ............ | 296/187.05 |
| 5,716,155 A * | 2/1998 | Yoshida et al. | ............. | 403/187 |
| 5,720,510 A * | 2/1998 | Daniel et al. | ............. | 296/187.05 |
| 5,725,271 A * | 3/1998 | Patel et al. | ................ | 296/187.05 |
| 5,806,919 A * | 9/1998 | Davies | ........................ | 296/205 |
| 5,829,219 A * | 11/1998 | Sugawara et al. | ............ | 52/653.2 |
| 5,984,402 A * | 11/1999 | Takeuchi | ................ | 296/187.12 |
| 6,086,141 A * | 7/2000 | Masuda et al. | ............. | 296/193.1 |
| 6,129,412 A * | 10/2000 | Tanuma | ........................ | 296/204 |
| 6,179,370 B1 * | 1/2001 | Takeuchi | ................. | 296/187.12 |
| 6,193,306 B1 * | 2/2001 | Lee | ................................ | 296/209 |
| 6,217,109 B1 * | 4/2001 | Okana et al. | ............ | 296/203.03 |
| 6,279,990 B1 * | 8/2001 | Miyasaka et al. | ........ | 296/203.03 |
| 6,293,617 B1 * | 9/2001 | Sukegawa | ................ | 296/203.03 |

(Continued)

FOREIGN PATENT DOCUMENTS

DE  4040946 C1  3/1992

(Continued)

OTHER PUBLICATIONS

"Italian Application Serial No. IT B020090492, Search Report dated Mar. 22, 2010", 3 pgs.

*Primary Examiner* — Kiran B Patel

(74) *Attorney, Agent, or Firm* — Schwegman Lundberg & Woessner, P.A.

(57) ABSTRACT

A chassis of a vehicle, the chassis is provided with a pair of door sills arranged longitudinally under the door zone and each having a through hole, and a pair of central pillars, each of which raises perpendicularly and vertically from a door sill, is made of one piece, is inserted in an interlocking way in the through hole of a window sill and is welded to the window sill at the through hole.

10 Claims, 2 Drawing Sheets

U.S. PATENT DOCUMENTS

| | | | |
|---|---|---|---|
| 6,322,135 B1 * | 11/2001 | Okana et al. | 296/203.03 |
| 6,332,643 B1 * | 12/2001 | Sukegawa et al. | 296/203.03 |
| 6,378,933 B1 * | 4/2002 | Schoen et al. | 296/187.02 |
| 6,482,486 B1 * | 11/2002 | Czaplicki et al. | 428/36.91 |
| 6,595,579 B2 * | 7/2003 | Freitag et al. | 296/187.12 |
| 6,641,208 B2 * | 11/2003 | Czaplicki et al. | 296/187.02 |
| 6,688,000 B2 * | 2/2004 | Wang et al. | 29/897.2 |
| 6,988,763 B2 * | 1/2006 | Saeki | 296/187.12 |
| 7,001,097 B2 * | 2/2006 | Wang et al. | 403/231 |
| 7,063,376 B2 * | 6/2006 | Ori et al. | 296/187.01 |
| 7,070,228 B2 * | 7/2006 | Shimizu et al. | 296/187.01 |
| 7,121,615 B2 * | 10/2006 | Hoshino | 296/203.03 |
| 7,318,873 B2 * | 1/2008 | Czaplicki et al. | 156/71 |
| 7,510,234 B2 * | 3/2009 | Ameloot et al. | 296/187.12 |
| 7,651,135 B2 * | 1/2010 | Hirotani | 280/802 |
| 7,815,247 B2 * | 10/2010 | Obayashi | 296/193.06 |
| 7,914,068 B2 * | 3/2011 | Mizohata | 296/193.06 |
| 7,976,098 B2 * | 7/2011 | Nishimura et al. | 296/193.06 |
| 2001/0000119 A1 | 4/2001 | Jaekel et al. | |
| 2004/0140693 A1 | 7/2004 | Gibbianelli et al. | |
| 2004/0232724 A1 * | 11/2004 | Patberg | 296/146.9 |
| 2006/0005503 A1 * | 1/2006 | Bladow et al. | 52/735.1 |
| 2007/0102964 A1 | 5/2007 | Yoshimoto et al. | |
| 2010/0295336 A1 * | 11/2010 | Itakura | 296/193.06 |

FOREIGN PATENT DOCUMENTS

| | | |
|---|---|---|
| EP | 1024073 A1 | 8/2000 |
| EP | 1247725 A1 | 10/2002 |
| EP | 1498345 A2 | 1/2005 |
| GB | 2001915 A | 2/1979 |

* cited by examiner

CHASSIS OF A VEHICLE PROVIDED WITH AN EXTRUDED CENTRAL PILLAR

RELATED APPLICATION

This application claims the benefit of priority under 35 U.S.C. Section 119 to Italian Patent Application Serial No. B02009A 000492, filed on Jul. 28, 2009, which is incorporated herein by reference in its entirety.

TECHNICAL FIELD

The present subject matter relates to a chassis of a vehicle. More specifically, the present subject is advantageously applied to the chassis of an automobile, to which explicit reference will be made in the following description without limitation.

BACKGROUND

A chassis of an automobile normally consists of a central body, forming the passenger compartment, and a front body supporting the front wheels and a rear body supporting the rear wheels. The engine may be arranged in frontal position, and thus accommodated in the front body, or in central or rear position, and thus accommodated in the rear body.

At the passenger compartment and approximately in the middle of the automobile, the chassis comprises two central pillars, each of which rises vertically from a door sill and ends at the roof. In most automobiles on the market, each side (e.g., comprising the door sill and the central pillar) is made of several pressed parts, which are superimposed and welded. Such a constructive method is fast and cost-effective when the material used for the chassis is steel and/or when a high number of parts are made (i.e. for mass manufactured automobiles), while it is more complex and costly when the material used for the chassis is aluminum and/or when a low number of parts are made (i.e. for small series automobiles).

Patent application EP1498345A2 describes a vehicle provided with a pair of door sills arranged longitudinally underneath the zone of the doors, and each having a through hole; and a pair of central pillars, each of which raises perpendicularly and vertically from a door sill, is made in one piece, is inserted in an interlocking way in the through hole of a window sill, and is welded to the window sill at the through hole.

SUMMARY

Some examples provide a chassis for a vehicle, which is free from drawbacks described above, and which is thus easy and cost-effective to make when the material used for the chassis is aluminum and/or when a low number of parts are made (i.e. for small series vehicles).

According to some examples, a chassis of a vehicle is provided as claimed in the attached claims.

BRIEF DESCRIPTION OF THE DRAWINGS

The present invention will now be described with reference to the accompanying drawings, which illustrate a non-limitative embodiment thereof, in which.

DETAILED DESCRIPTION

Figure 1:
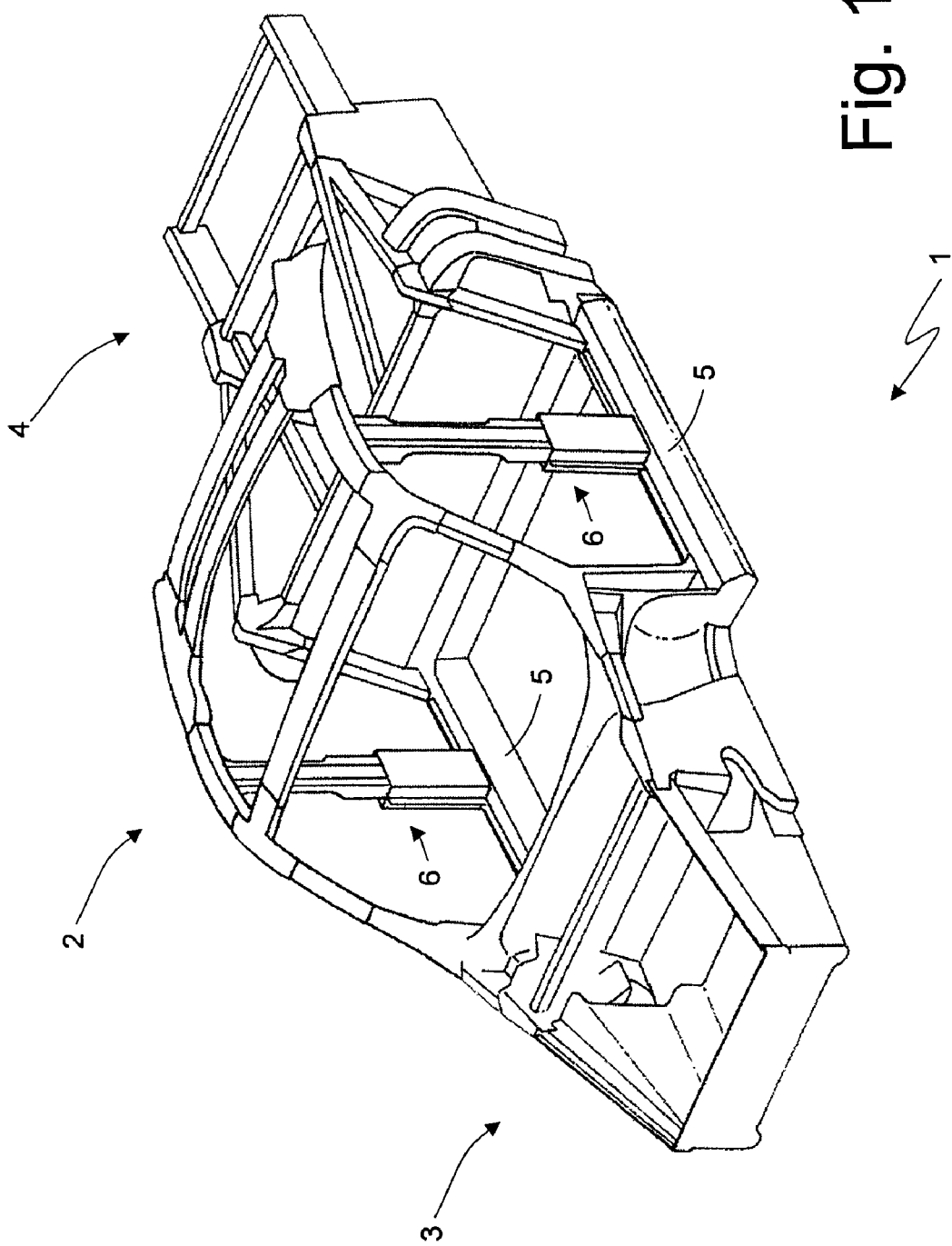
FIG. 1 is a diagrammatic, perspective view of a chassis of a vehicle made in accordance with some examples.

In FIG. 1, numeral 1 indicates as a whole a chassis of an automobile comprising a central body 2, in which a passenger compartment is defined, a front body 3, in which a luggage compartment, also known as a trunk or boot, is defined, and rear body 4, in which an engine compartment is defined. In various examples, the front body 3 and the rear body 4 are bolted to the central body 2 so as to be disassembled if needed. Furthermore, according to certain examples, the chassis 1 comprises a floor pan (not shown), which is inferiorly (i.e., under) bolted at least to the central body 2.

The central body 2 of the chassis 1 is made of aluminum by welding several components, and in particular the central body 2 comprises a plurality of linear bars, which display a constant section, are made by extrusion, and are joined together by welding at structural nodes defined by junction bodies. Each junction body has a number of respective pockets (not shown in detail), which are adapted to elongate the head of corresponding linear bars. In particular, four junction bodies are present (two front junction bodies and two rear junction bodies) at the attachment zone of each suspension.

Two linear bars of the central body 2 arranged longitudinally underneath the door zone form the door sills 5 (i.e. the lower part underneath the doors which extends from the end of the front wheel arch to the beginning of the rear wheel arch). A central pillar 6 rises perpendicularly and vertically from each door sill 5, which extends from the door sill 5 to an upper bar which is arranged longitudinally and defines a side end of the roof.

Figure 4:
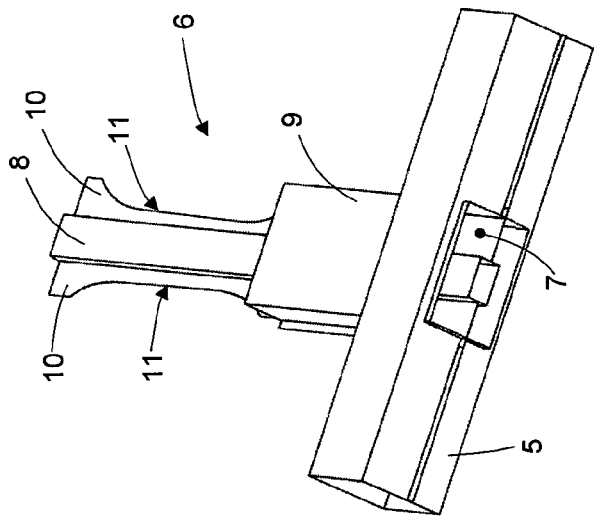
FIG. 4 is a perspective bottom view of the door sill and of the central pillar in FIG. 2.
Figure 3:
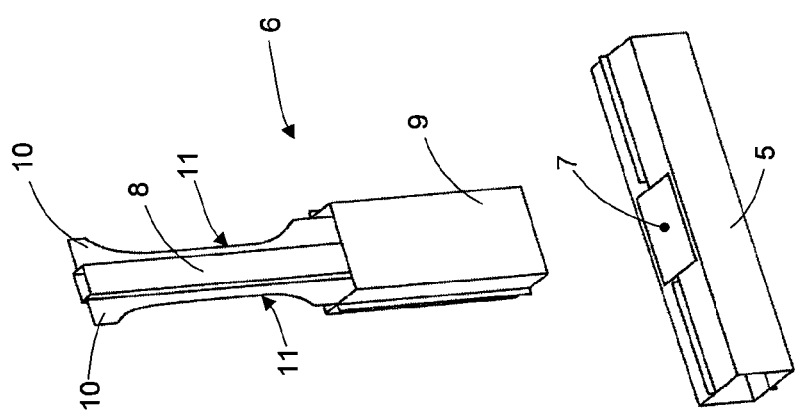
FIG. 3 is a perspective, exploded view of the door sill and of the central pillar in FIG. 2.
Figure 2:
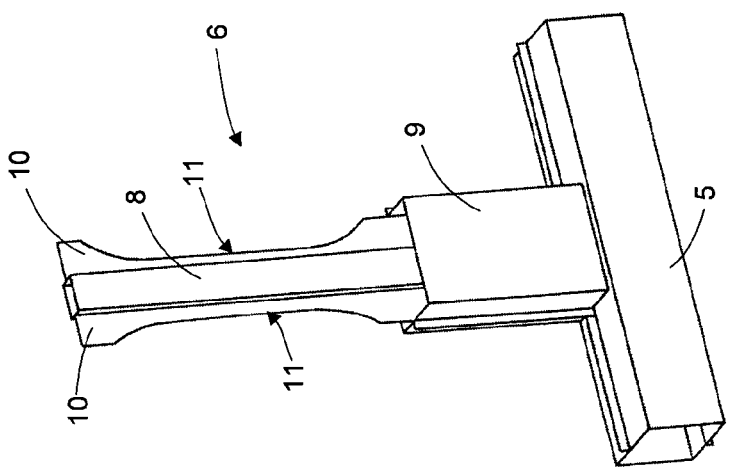
FIG. 2 is a perspective view of a door sill and a central pillar of the chassis in FIG. 1.

As shown in FIG. 2-4, each central pillar 6 consists of a one-piece or monolithic extrusion (i.e. free from parts added by welding, screwing, riveting or other mechanical connection methods). Each door sill 5 has a through hole 7, in which a central pillar 6 is inserted in an interlocking way; furthermore, each central pillar 6 is welded to the door sill 5 at the through hole 7.

Each central pillar 6 comprises an internal tubular body 8 inserted coaxially inside an external tubular body 9; both bodies 8 and 9 have a rectangular transversal section and are connected to one another by means of two flat plates 10, which connect the internal tubular body 8 to the external tubular body 9 and are arranged reciprocally coplanar on opposite sides of the internal tubular body 8.

In some examples, the internal tubular body 8 of each central pillar 6 extends along the extension of the central pillar 6 itself, while the external tubular body 9 of each central pillar 6 extends only along a lower portion of the central pillar 6 itself arranged at the door sill 5 (in particular, the external tubular body 9 of each central pillar 6 extends inside the door sill 5 and partially even outside the door sill 5). This shape of each central pillar 6 allows to obtain high mechanical strength at door sill 5 (i.e. when the main mechanical stress occurs) combined with a low total weight.

In order to reduce the weight of each central pillar 6, the two flat plates 10 of each central pillar 6 have windows 11 (i.e. reliefs made by eliminating material) arranged outside the external tubular body 9.

Underneath, each central pillar 6 is inserted in an interlocking way inside a hole 7 of a door sill 5 and is also welded to the door sill 5; superiorly (i.e., above), each central pillar 6 is fixed to an upper part of the chassis 1. The fastening of each central pillar 6 to the upper bar may be similar to the fastening of the central pillar 6 to the door sill 5 (thus the upper bar has a through hole which accommodates the central pillar 6, which is also welded to the upper bar itself), or the central pillar 6 may also be welded to the upper bar.

According to some examples, each door sill 5 is initially made in one piece by extrusion and then mechanically machined by elimination of material to remove the unnecessary parts (i.e. by mechanically cutting part of the external tubular body 9 and mechanically cutting the plates 10 to make the windows 11).

The above-described chassis 1 has many advantages.

Firstly, the above-described chassis 1 is very robust with respect to side collisions because it has very high mechanical strength in the connection between the door sill 5 and a central pillar 6; in particular, such as result is obtained by mechanically inserting the central pillar 6 in the through hole 7 of the door sill 5 in an interlocking way.

Furthermore, the above-described chassis 1 is simple and cost-effective to make, also when the material used for the chassis is aluminum.

Finally, the above-described chassis 1 is simple and cost-effective to make, also when a low number of parts is made (i.e. for small series automobiles).

The invention claimed is:

1. Chassis of a vehicle, the chassis comprising:
   a pair of door sills arranged longitudinally to define a length, with each of the pair of door sills located below a respective door area, with each of the door sills defining a respective through hole extending through the door sill transverse to the length of the door sill, and
   a pair of central pillars, with each of the pair of central pillars comprising a single piece extrusion, with each of the pair of pillars extending perpendicularly and vertically away from a respective door sill, each of the pair of pillars being disposed through and interlocked in a respective through hole defined in a respective door sill, with each of the pair of central pillars being welded to the respective door sill in a position in which it is disposed through the respective through hole,
   wherein each central pillar comprises an inner tubular body disposed coaxially inside an outer tubular body, and at least two flat plates, each extending between the inner tubular body and the outer tubular body connecting the inner tubular body to the outer tubular body, the at least two flat plates being coplanar to each other and disposed on opposite sides of the inner tubular body.

2. Chassis according to claim 1, wherein the tubular bodies of each central pillar each define a rectangular cross section.

3. Chassis according to claim 1, wherein the inner tubular body of each central pillar extends along the whole length of the central pillar.

4. Chassis according to claim 1, wherein the outer tubular body extends only along a lower portion of the central pillar itself arranged in correspondence of the door sill.

5. Chassis according to claim 4, wherein the outer tubular body of each central pillar extends outside the door sill.

6. Chassis according to claim 4, wherein, outside of the outer tubular body, each of the two flat plates define respective window-shaped cut-outs.

7. The chassis according to claim 1 wherein each of the internal tubular body and external tubular body defines a rectangular cross section.

8. The chassis according to claim 1 wherein the two flat plates define reliefs opening away from the external outer tubular body.

9. The chassis according to claim 8 wherein each of the pair of pillars is a monolithic extrusion.

10. The chassis according to claim 9 wherein the reliefs are excised transverse to the plane of the two flat plates, from the material of the two flat plates.

* * * * *

UNITED STATES PATENT AND TRADEMARK OFFICE
CERTIFICATE OF CORRECTION

| | | |
|---|---|---|
| PATENT NO. | : 8,272,682 B2 | Page 1 of 1 |
| APPLICATION NO. | : 12/844422 | |
| DATED | : September 25, 2012 | |
| INVENTOR(S) | : Cimatti | |

It is certified that error appears in the above-identified patent and that said Letters Patent is hereby corrected as shown below:

On the Title page, in field (73), in "Assignee", in column 1, line 1, delete "Studio Torta S.p.A. (IT)" and insert -- Ferrari S.p.A., (IT) --, therefor.

Signed and Sealed this
Eighth Day of January, 2013

David J. Kappos
*Director of the United States Patent and Trademark Office*